United States Patent
Lin et al.

(10) Patent No.: US 10,635,200 B1
(45) Date of Patent: Apr. 28, 2020

(54) TOUCH KNOB DEVICE MOUNTABLE TO A CURVED SURFACE

(71) Applicants: Interface Technology (ChengDu) Co., Ltd., Chengdu, Sichuan (CN); Interface Optoelectronics (ShenZhen) Co., Ltd., Shenzhen, Guangdong (CN); General Interface Solution Limited, Miaoli County (TW)

(72) Inventors: Chih-Chiang Lin, Miaoli County (TW); Yen-Heng Huang, Miaoli County (TW)

(73) Assignees: Interface Technology (ChengDu) Co., Ltd., Chengdu (CN); Interface Optoelectronics (ShenZhen) Co., Ltd., Shenzhen (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 16/262,458

(22) Filed: Jan. 30, 2019

(30) Foreign Application Priority Data

Dec. 7, 2018 (CN) .......................... 2018 1 1494550

(51) Int. Cl.
*G06F 3/0362* (2013.01)
*G06F 3/041* (2006.01)

(52) U.S. Cl.
CPC ............ *G06F 3/0362* (2013.01); *G06F 3/041* (2013.01)

(58) Field of Classification Search
CPC ................................. G06F 3/0362; G06F 3/041
See application file for complete search history.

(56) References Cited

U.S. PATENT DOCUMENTS

| 5,841,428 | A  | * | 11/1998 | Jaeger ................. G02F 1/13306 345/184 |
| 5,859,631 | A  | * | 1/1999  | Bergman ............... H01H 9/181 345/156 |
| 5,936,613 | A  | * | 8/1999  | Jaeger ................... G06F 3/0238 345/172 |
| 9,925,456 | B1 | * | 3/2018  | Hershey ................ G06F 3/0481 |
| 10,139,929 | B2 | * | 11/2018 | Krishnakumar ..... G06F 3/03547 |
| 2008/0238879 | A1 | * | 10/2008 | Jaeger ................. G06F 3/03545 345/173 |
| 2011/0199301 | A1 | * | 8/2011  | Zhao ..................... G06F 1/3215 345/158 |
| 2011/0227841 | A1 | * | 9/2011  | Argiro .................... G06F 3/044 345/173 |
| 2014/0267039 | A1 | * | 9/2014  | Curtis ................... G06F 3/0338 345/161 |

(Continued)

*Primary Examiner* — Mihir K Rayan
(74) *Attorney, Agent, or Firm* — Rabin & Berdo, P.C.

(57) ABSTRACT

A touch knob device that is mountable to a curved surface of a touch panel is provided. The touch knob device is removably disposed on a curved touch panel for controlling the touch panel. The touch knob device comprises a flexible base and a sense measuring knob. The base comprises a soft base body, a base pad and a base platform. The bottom surface of the base body contacts the base platform which connects the touch knob device to the touch panel. The sensing knob is rotatably disposed along an axis on the base top surface. A conductive line is connected between the sensing knob and the base pad for transferring the rotational direction or position of the sensing knob to a sensor on the touch panel via the base pad. Rotating the sensing knob allows the touch knob device to control aspects of the touch panel.

10 Claims, 5 Drawing Sheets

(56) References Cited

U.S. PATENT DOCUMENTS

2017/0024117 A1*  1/2017  Hong ................... G06F 40/166
2017/0269722 A1*  9/2017  Krishnakumar .... G06F 3/03547
2017/0371474 A1* 12/2017  Ligameri ............. G06F 3/0416
2018/0046318 A1*  2/2018  Aurongzeb ......... G06F 3/04886

* cited by examiner

TOUCH KNOB DEVICE MOUNTABLE TO A CURVED SURFACE

BACKGROUND OF THE INVENTION

Field of the Invention

The present invention relates to a control knob device. More specifically, the present invention discloses a touch knob device that is mountable to a curved surface of a touch panel and allows a user to control aspects of the touch panel by adjusting the touch knob device.

Description of the Prior Art

Touch panels are widely used for input interfaces due to its intuitive operation. Consumer electronics applications for touch panels that are included in combination with a display are more extensively used, such as mobile phones, satellite navigation systems (GPS navigator systems), flat panel computer displays, tablet computers, and laptop computers.

Recently, curved touch panels have been designed which have application advantages. First of all, the curved touch panel is more readily recognized by appearance, which allows obvious product segmentation and successfully creates marketing opportunities. In addition, a curved touch screen implemented as the touch screen of a smart phone brings enhanced visual enjoyment similar to a display without a border or bezel. On curved touch-screen TVs and other large panels, users can also experience an effect of being surrounded by images, thereby providing a great viewing experience.

In order to permit the touch panel to be controlled by physical objects, manufacturers have to implement a control knob to increase the convenience of controlling the volume or brightness of the touch panel. However, the conventional control knob cannot be bonded on the curved surface of the curved touch panel.

Therefore, there is need for a touch knob device that is mountable to a curved surface of a touch panel in order to overcome the disadvantages of conventional control knobs.

SUMMARY OF THE INVENTION

An objective of the present invention is to provide a touch knob device that can be removably disposed on a curved surface of a touch panel that allows control of the touch panel.

To achieve the above and other objectives, the touch knob device of the present invention comprises a soft flexible base, having a base platform, a base pad, and a base body having a top surface and a bottom surface, the bottom surface disposed on the opposite side surface to the top surface. The base pad is disposed against the bottom surface and connects to the surface of the touch panel thereby attaching the touch knob device to the curved surface of a touch panel. A sensing knob is rotatably disposed along an axis on the top surface. A conductive line for sensing the rotational direction of the sensing knob is connected between the sensing knob and the base pad.

In an embodiment the base body comprises an insulating body.

In an embodiment the base platform comprises a suction cup or a double-sided tape.

In an embodiment the sensing knob is made of a conductive material.

In an embodiment the sensing knob comprises metal or conductive rubber.

In an embodiment the conductive line is disposed on the top surface and bends downward and extends to connect with the base pad.

In an embodiment the conductive line comprises conductive rubber.

In an embodiment the area of the conductive line is between 3 and 5 square millimeters.

In an embodiment the sensing knob further comprises a plurality of flanges disposed on a lower portion of the sensing knob.

In an embodiment the plurality of flanges are made of an elastic material.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification.

The drawings illustrate embodiments of the invention and, together with the description, serve to explain the principles of the invention. In the drawings.

DESCRIPTION OF THE PREFERRED EMBODIMENTS

Reference will now be made in detail to the preferred embodiments of the present invention, examples of which are illustrated in the accompanying drawings.

Figure 1:
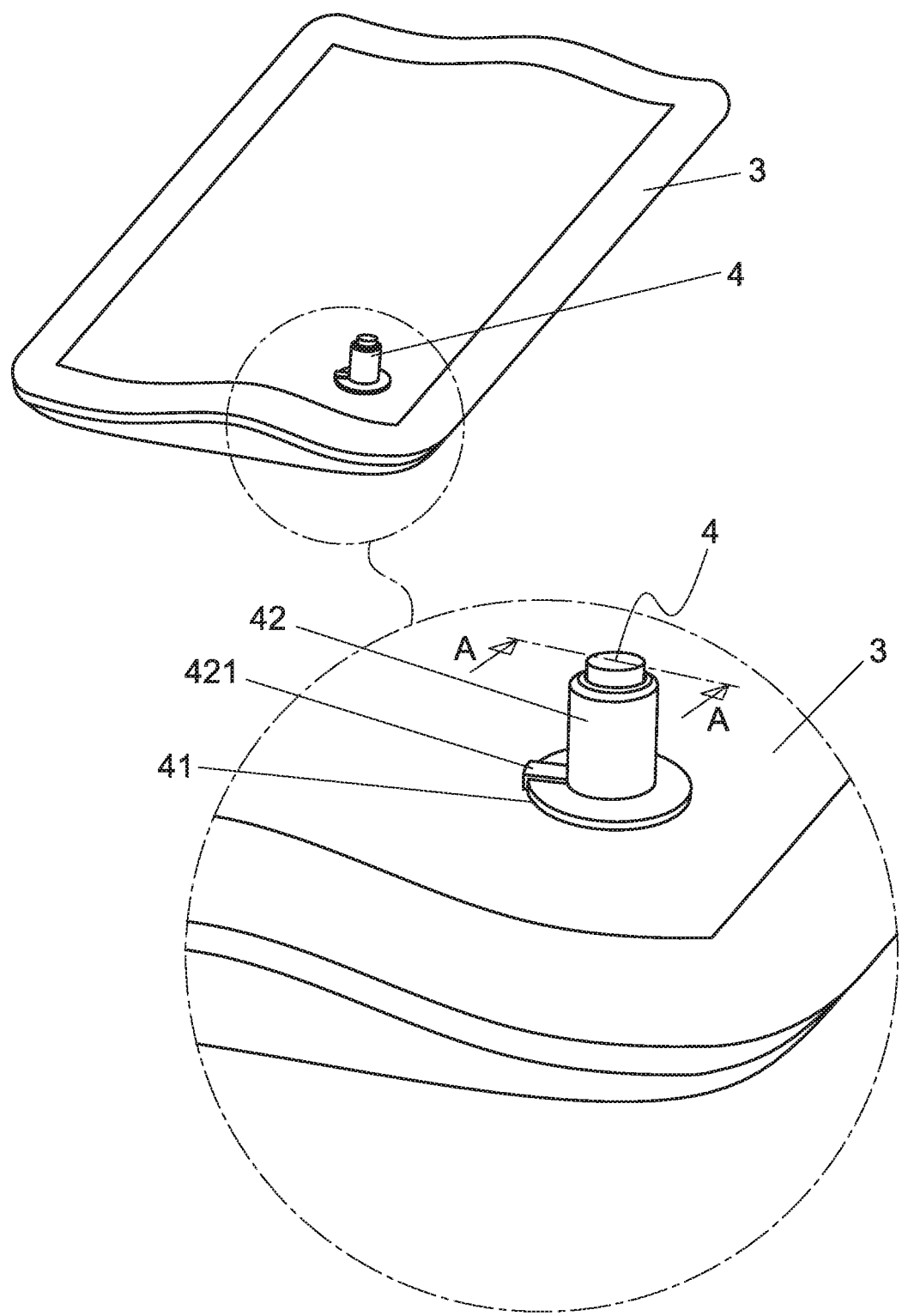
FIG. 1 is a drawing illustrating a touch knob device according to an embodiment of the present invention.
Figure 2:
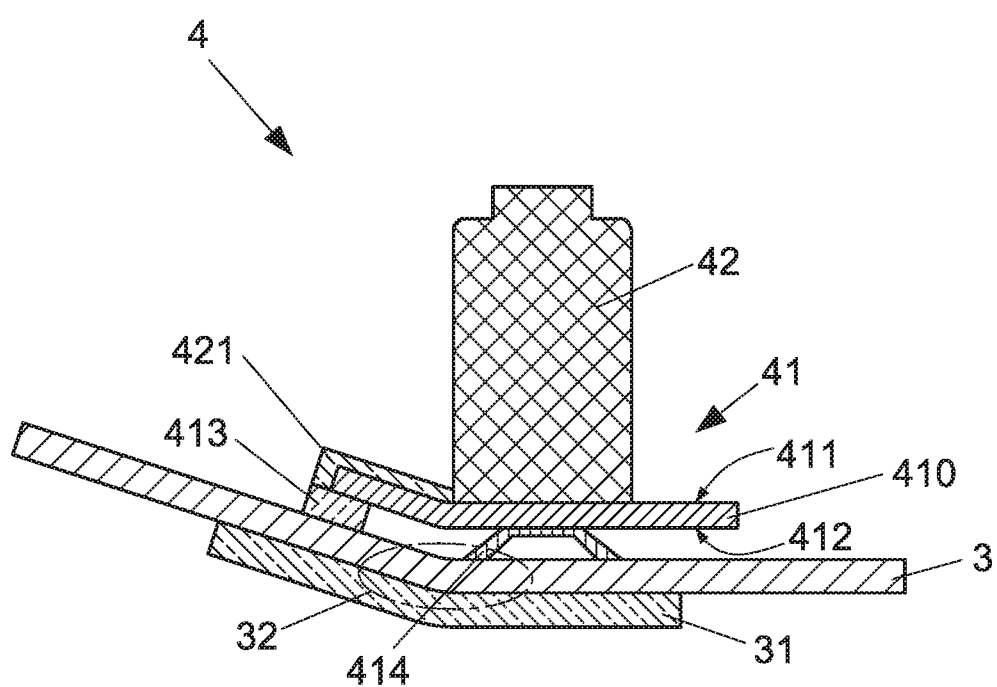
FIG. 2 is a sectional view drawing (A-A) of FIG. 1.

Refer to FIG. 1 and FIG. 2, which are drawings illustrating a touch knob device according to the present invention. As shown in the figures the touch knob device 4 is removably disposed on a surface of a touch panel 3. The surface of the touch panel 3 has a sensor 31 and a curved portion 32, wherein the curved portion 32 is bent in a curved peak pattern (convex) or a curved valley pattern (concave). The touch knob device 4 is configured to control aspects of the curved touch panel 3. The touch knob device 4 comprises a flexible base 41 and a sensing knob 42.

The flexible base 41 comprises a base body 410, a base pad 413 and a base platform 414. The base body 410 comprises a base top surface 411 and a base bottom surface 412, the base bottom surface 412 is disposed on the opposite surface to the base top surface 411 of the flexible base 41. The base pad 413 is disposed under a portion of the base bottom surface 412, for contact with and connection to the curved surface of the touch panel 3. The base pad 413 comprises, for example, a conductive rubber material. The base platform 414 is disposed under the base bottom surface 412 of the touch knob device 4 and is fixed to the surface of the touch panel 3. The base platform 414 comprises, for example, a double-sided tape or a suction cup firmly fixed to the surface of the touch panel 3. The base body 410 comprises, for example, an insulating material or an elastic material thereby conforming to the surface of the touch panel 3.

The sensing knob 42 is rotatably disposed on the base top surface 411 along an axis for sensing a direction of rotation, such as a clockwise direction or a counter-clockwise direction. The sensing knob 42 has a conductive line 421. One end of the conductive line 421 is connected to the sensing knob 42, and the other end is connected to the base pad 413. In detail, the sensing knob 42 comprises a conductive material such as metal or conductive rubber. The conductive line 421 is disposed on a portion of the base top surface 411 and is bent and extends to connect to the base pad 413. The conductive line 421 comprises, for example, conductive rubber, and the area of the conductive line 421 is between 3~5 square millimeters.

Figure 3A:
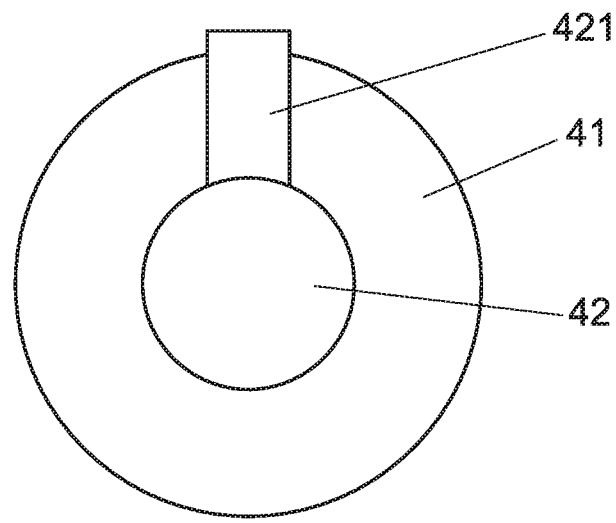
FIG. 3A is a top surface view of the touch knob device according to an embodiment of the present invention.
Figure 3B:
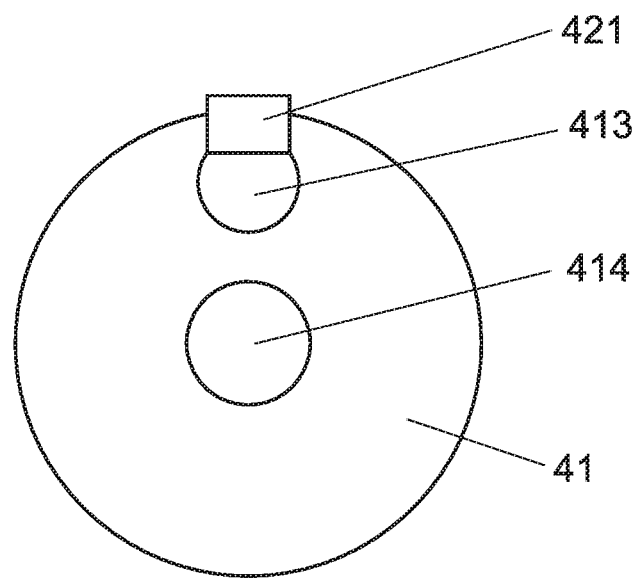
FIG. 3B is a bottom surface view of the touch knob device according to an embodiment of the present invention.

Refer to FIG. 3 A and FIG. 3 B. One end of the conductive line 421 is connected to the sensing knob 42 and is disposed on the base top surface 411. The conductive line 421 is bent downward and connects to the base pad 413.

Figure 4:
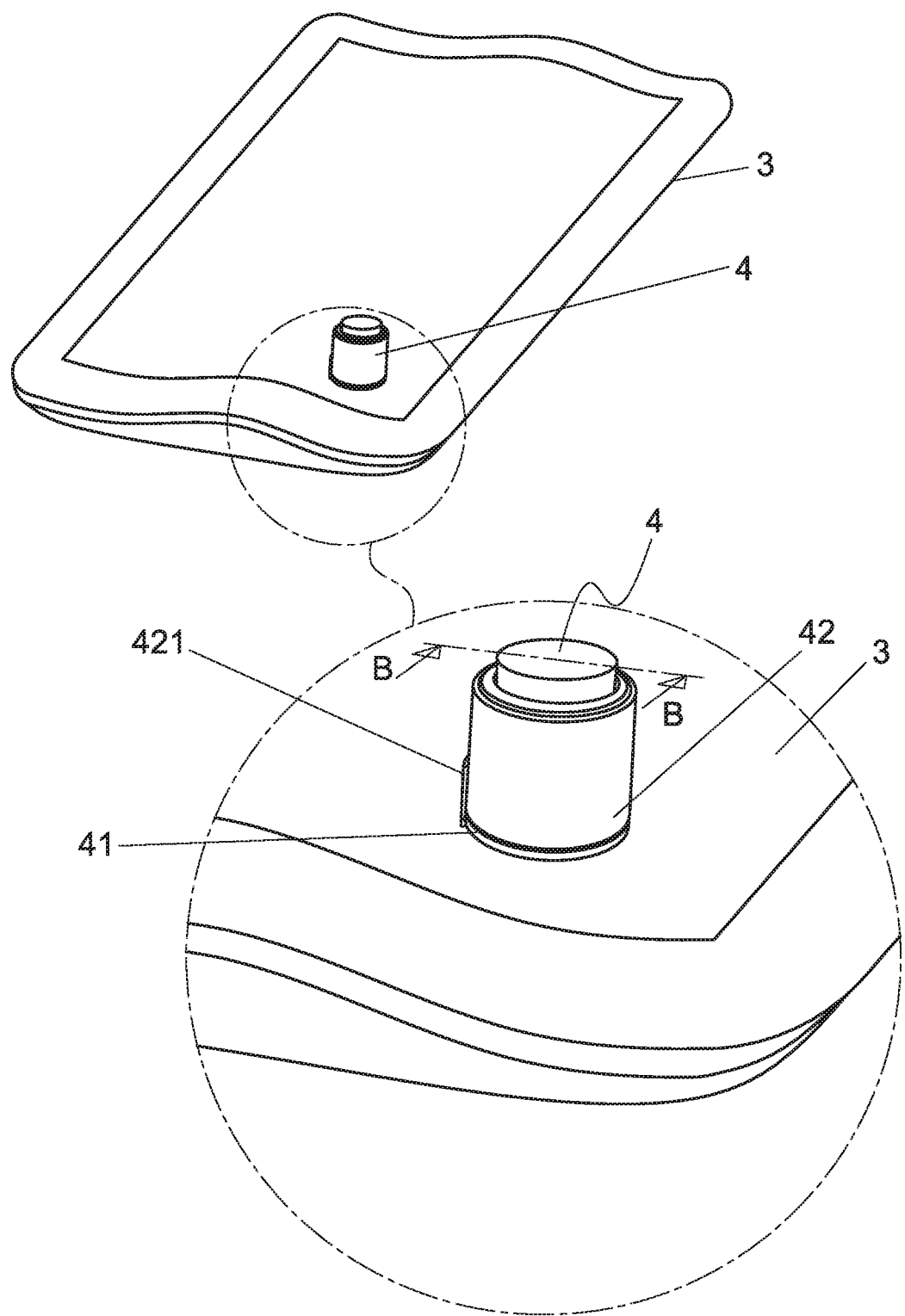
FIG. 4 is a drawing illustrating a touch knob device according to an embodiment of the present invention.
Figure 5:
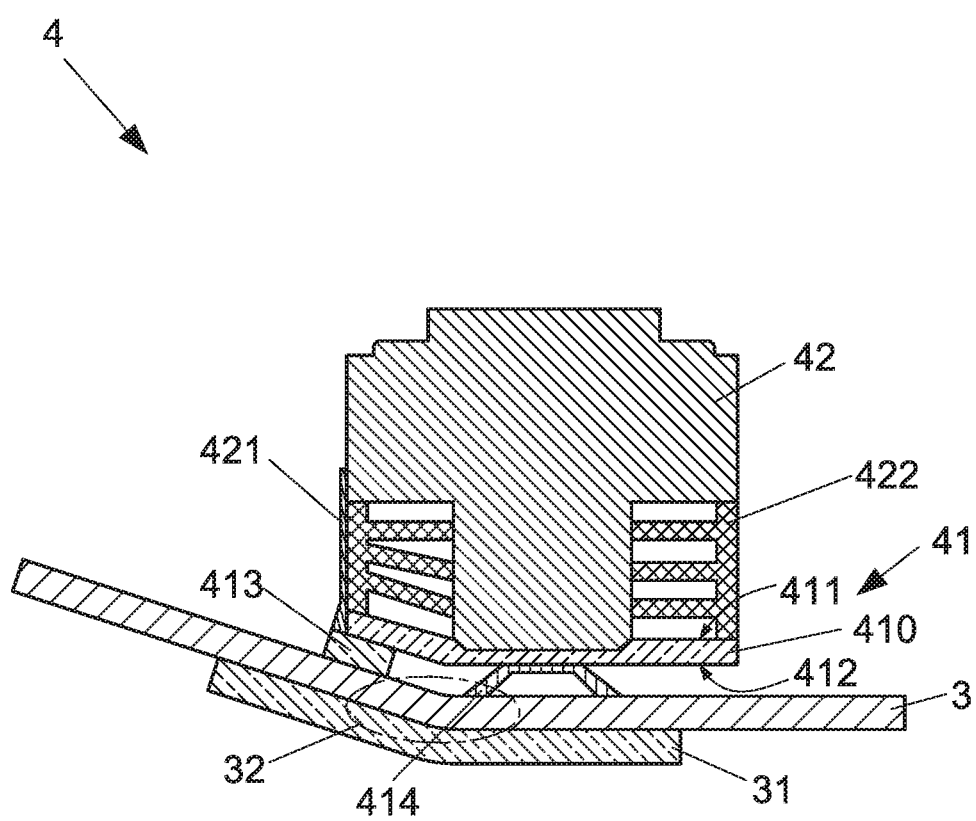
FIG. 5 is a sectional view drawing (B-B) of FIG. 4.

Refer to FIG. 4 and FIG. 5. This embodiment shows different aspects of the sensing knob 42. The sensing knob 42 further comprises a plurality of flanges 422 disposed on the lower portion of the sensing knob 42. It should be noted that the plurality of flanges 422 comprises an elastic material. For example, the plurality of flanges 422 comprises a material having a low-density elastic material such as foam. The touch knob device 4 of this embodiment can be similarly attached to the curved touch panel 3 as previously described. In an embodiment the plurality of flanges 422 comprises three crossbars, however, in other embodiments the plurality of flanges comprises straight bars, bent bars, curved bars, or mesh. Since the plurality of flanges 422 are elastic material, the plurality of flanges 422 can be bent according to the surface of the curved touch panel 3, so that the sensing knob 42 of the present invention can be attached to the curved touch panel 3.

When the user wants to use the touch knob device 4 of the present invention, the user rotates the sensing knob 42 thereby controlling aspects of the attached touch panel 3. Since the touch knob device is connected to the curved surface of the touch panel 3, the sensor 31 of the touch panel 3 detects the movement or position of the sensing knob 42 via the conductive line 421.

When the user wants to control the volume or brightness of the curved touch panel 3, the sensing knob 42 can be grasped and rotated clockwise or counter-clockwise. Since the sensing knob 42 has a conductive line 421, the conductive line 421 transmits the direction of rotation of the sensing knob 42 to the base pad 413. As a result, the sensor 31 under the surface of the touch panel 3 receives a user control command Because the present invention is provided with a flexible base 41 and a soft conductive line 421, the touch knob device 4 can be bonded to the bent portion 32 of the touch panel surface.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A touch knob device that is removably mountable to a curved surface of a touch panel for controlling the touch panel comprising:
   a flexible base comprising a base platform, a base pad, and a base body, wherein the base body has a top surface and a bottom surface, the bottom surface contacting the base pad and the base platform for attaching the touch knob device to the curved surface of the touch panel;
   a sensing knob rotatably disposed along an axis on the top surface for sensing the rotational direction of the sensing knob; and
   a conductive line connected between the sensing knob and the base pad.

2. The touch knob device of claim 1, wherein the base body comprises an insulating body.

3. The touch knob device of claim 1, wherein the base platform comprises a suction cup or a double-sided tape.

4. The touch knob device of claim 1, wherein the sensing knob comprises a conductive material.

5. The touch knob device of claim 4, wherein the sensing knob comprises metal or conductive rubber material.

6. The touch knob device of claim 1, wherein the conductive line is disposed on the top surface and bent downward to extend to connect to the base pad.

7. The touch knob device of claim 1, wherein the conductive line comprises electrically conductive rubber.

8. The touch knob device of claim 1, wherein the conductive line has an area of between 3 and 5 square millimeters.

9. The touch knob device of claim 1, wherein the sensing knob further comprises a plurality of flanges disposed on a lower portion of the sensing knob.

10. The touch knob device of claim 9, wherein the plurality of flanges comprises an elastic material.

* * * * *